(12) United States Patent
Kim et al.

(10) Patent No.: US 12,374,802 B2
(45) Date of Patent: *Jul. 29, 2025

(54) META-STRUCTURE

(71) Applicant: ELECTRONICS AND TELECOMMUNICATIONS RESEARCH INSTITUTE, Daejeon (KR)

(72) Inventors: Yong Hae Kim, Daejeon (KR); Chi-Sun Hwang, Daejeon (KR); Joo Yeon Kim, Daejeon (KR); Jaehyun Moon, Daejeon (KR); Jong-Heon Yang, Daejeon (KR); Kyunghee Choi, Daejeon (KR); Ji Hun Choi, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 138 days.

This patent is subject to a terminal disclaimer.

(21) Appl. No.: 18/343,068

(22) Filed: Jun. 28, 2023

(65) Prior Publication Data

US 2024/0128653 A1 Apr. 18, 2024

(30) Foreign Application Priority Data

Oct. 5, 2022 (KR) ........................ 10-2022-0127385

(51) Int. Cl.
*H01Q 15/00* (2006.01)
*H01Q 1/36* (2006.01)
*H01Q 15/14* (2006.01)

(52) U.S. Cl.
CPC ......... *H01Q 15/0086* (2013.01); *H01Q 1/364* (2013.01); *H01Q 15/148* (2013.01)

(58) Field of Classification Search
CPC ............. H01Q 15/0086; H01Q 15/148; H01Q 1/364; H01Q 1/38; G02B 1/002
See application file for complete search history.

(56) References Cited

U.S. PATENT DOCUMENTS

| 6,747,779 B1 | 6/2004 | Morin et al. |
| 9,442,460 B2 | 9/2016 | Yoon et al. |

(Continued)

FOREIGN PATENT DOCUMENTS

| KR | 10-2001-0043668 A | 5/2001 |
| KR | 10-2007-0065551 A | 6/2007 |

(Continued)

OTHER PUBLICATIONS

Junghyun Park et al., "All-solid-state spatial light modulator with independent phase and amplitude control for three-dimensional LiDAR applications", Nature nanotechnology, Jan. 2021, p. 69-76, vol. 16.

(Continued)

*Primary Examiner* — Seokjin Kim (57) ABSTRACT

Disclosed is a meta-structure. The meta-structure includes a lower electrode, a lower insulating layer on the lower electrode, a lower metal oxide layer on the lower insulating layer, a metal layer on the lower metal oxide layer, an upper metal oxide layer on the metal layer, an upper insulating layer on the upper metal oxide layer, and antenna electrodes on the upper insulating layer.

13 Claims, 11 Drawing Sheets

(56) References Cited

U.S. PATENT DOCUMENTS

| 10,928,700 | B2 | 2/2021 | Lee et al. | |
|---|---|---|---|---|
| 2011/0199273 | A1 | 8/2011 | Kim et al. | |
| 2012/0326944 | A1 | 12/2012 | Choi et al. | |
| 2017/0045759 | A1* | 2/2017 | Han | G02F 1/0136 |
| 2019/0018299 | A1* | 1/2019 | Park | G02F 1/292 |
| 2019/0033682 | A1* | 1/2019 | Kafaie Shirmanesh | G02F 1/29 |
| 2024/0061306 | A1* | 2/2024 | Kim | G02F 1/19 |

FOREIGN PATENT DOCUMENTS

| KR | 10-2018-0022105 | A | | 3/2018 | |
|---|---|---|---|---|---|
| KR | 10-2018-0103662 | A | | 9/2018 | |
| KR | 10-2019-0092257 | A | | 8/2019 | |
| KR | 20190092257 | A | * | 8/2019 | H01Q 15/0086 |
| KR | 20220002791 | A | * | 1/2022 | G01S 17/89 |

OTHER PUBLICATIONS

Yong-Hae Kim et al. "Active metasurface using ITO device in visible wavelength", META 2022 Torremolinos-Spain, The 12th International Conference on Metamaterials, Photonic Crystals and Plasmonics, Jul. 2022.

* cited by examiner

META-STRUCTURE

CROSS-REFERENCE TO RELATED APPLICATIONS

This U.S. non-provisional patent application claims priority under 35 U.S.C. § 119 of Korean Patent Application No. 10-2022-0127385, filed on Oct. 5, 2022, the entire contents of which are hereby incorporated by reference.

BACKGROUND

The present disclosure herein relates to a meta-structure, and more particularly, to a meta-structure having high complex modulation efficiency.

In general, few meta-structures perform active modulation at visible light wavelengths. Meta-structures operate in a near infrared region when using ITO electrodes, and operate in a mid-infrared region when using graphene electrodes. Recently, it has been reported that an epsilon near zero (ENZ) frequency at which effective permittivity becomes zero may be adjusted by stacking metals and dielectrics. When the metals and dielectrics are sufficiently thin, effective permittivity may be expressed as below according to a mean field theory. When the metals and ITO follow a Drude model, an effective refractive index may reduce.

SUMMARY

The present disclosure provides a meta-structure capable of increasing complex light modulation efficiency.

An embodiment of the inventive concept provides a meta-structure including: a lower electrode; a lower insulating layer on the lower electrode; a lower metal oxide layer on the lower insulating layer; a metal layer on the lower metal oxide layer; an upper metal oxide layer on the metal layer; an upper insulating layer on the upper metal oxide layer; and antenna electrodes on the upper insulating layer.

In an embodiment, the lower metal oxide layer may include: a first lower metal oxide layer; and a second lower metal oxide layer on the first lower metal oxide layer.

In an embodiment, the upper metal oxide layer may further include: a first upper metal oxide layer; and a second upper metal oxide layer provided between the first upper metal oxide layer and the upper insulating layer and aligned with the antenna electrodes.

In an embodiment, the lower metal oxide layer and the upper metal oxide layer each may include indium tin oxide (ITO).

In an embodiment, the metal layer may include silver.

In an embodiment, the lower insulating layer and the upper insulating layer may include an aluminum oxide.

In an embodiment, the antenna electrodes may have a width of 40 nm and a separation distance of 120 nm.

In an embodiment, the antenna electrodes may have a width of 50 nm and a separation distance of 120 nm.

In an embodiment, the antenna electrodes may have a width of 70 nm and a separation distance of 80 nm.

In an embodiment, the antenna electrodes may have a pitch of 150 nm to 170 nm.

In an embodiment, the antenna electrodes may have a width of 60 nm and a separation distance of 90 nm.

In an embodiment, the antenna electrodes may have a width of 70 nm and a separation distance of 170 nm.

In an embodiment, the antenna electrodes may have a width of 150 nm and a separation distance of 210 nm.

BRIEF DESCRIPTION OF THE FIGURES

The accompanying drawings are included to provide a further understanding of the inventive concept, and are incorporated in and constitute a part of this specification. The drawings illustrate embodiments of the inventive concept and, together with the description, serve to explain principles of the inventive concept. In the drawings.

DETAILED DESCRIPTION

Embodiments of the inventive concept will now be described in detail with reference to the accompanying drawings. Advantages and features of embodiments of the inventive concept, and implementation methods thereof will be clarified through following embodiments described with reference to the accompanying drawings. However, the inventive concept may be embodied in different forms and should not be construed as limited to the embodiments set forth herein. Rather, these embodiments are provided so that this disclosure will be thorough and complete, and will fully convey the scope of the present invention to those skilled in the art, and the present invention is only defined by the scope of the claims. Like reference numerals refer to like elements throughout.

The terminology used herein is not for delimiting the embodiments of the inventive concept but for describing the embodiments. The terms of a singular form may include plural forms unless otherwise specified. It will be further understood that the terms "includes", "including", "comprises", and/or "comprising", when used 'in this description, specify the presence of stated elements, operations, and/or components, but do not preclude the presence or addition of one or more other elements, operations, and/or components. Furthermore, reference numerals, which are presented in the order of description, are provided according to the embodiments and are thus not necessarily limited to the order.

The embodiments of the inventive concept will be described with reference to example cross-sectional views and/or plan views. In the drawings, the dimensions of layers and regions are exaggerated for clarity of illustration. Therefore, the forms of the example drawings may be changed due to a manufacturing technology and/or error tolerance. Therefore, the embodiments of the inventive concept may involve changes of shapes depending on a manufacturing process, without being limited to the illustrated specific forms.

Figure 1:
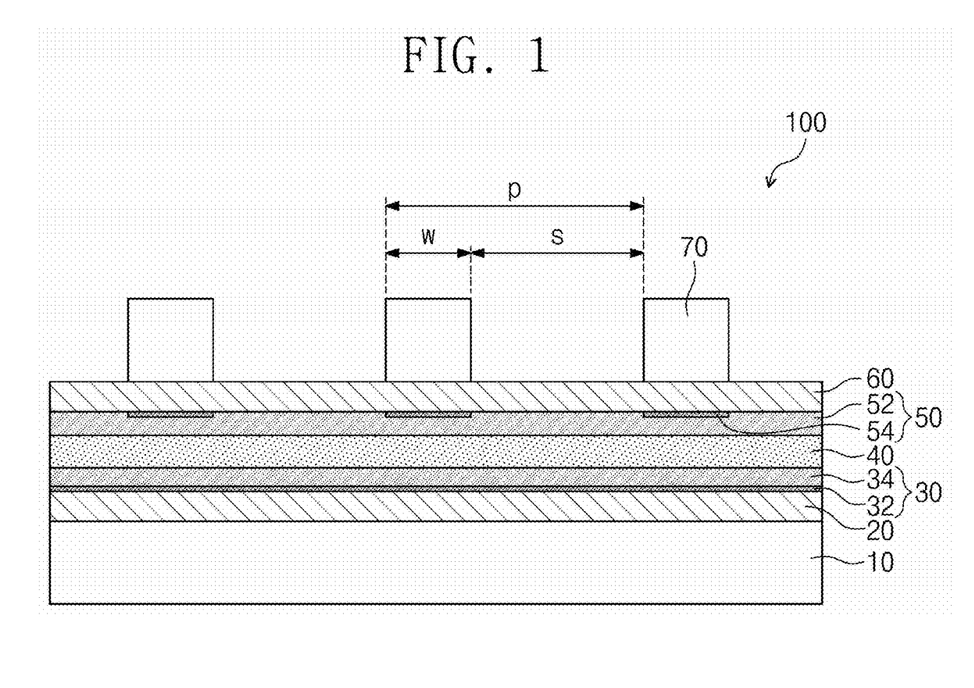
FIG. 1 is a cross-sectional view of an example of a meta-structure according to the inventive concept.

FIG. 1 illustrates an example of a meta-structure 100 according to the inventive concept.

Referring to FIG. 1, the meta-structure 100 of the inventive concept may be a meta-structure that actively modulates at visible light wavelengths. According to an example, the meta-structure 100 of the inventive concept may include a lower electrode 10, a lower insulating layer 20, a lower metal oxide layer 30, a metal layer 40, an upper metal oxide layer 50, an upper insulating layer 60, and antenna electrodes 70.

The lower electrode 10 may be provided below the lower insulating layer 20. The lower electrode 10 may include a transparent electrode. For example, the lower electrode 10 may include aluminum (Al). Alternatively, the lower electrode 10 may include gold (Au), silver (Ag), copper (Cu), aluminum (Al), tungsten (W), or ITO (indium tin oxide), but an embodiment of the inventive concept is not limited thereto. The lower electrode 10 may have a thickness of about 100 nm or more.

The lower insulating layer 20 may be provided on the lower electrode 10. The lower insulating layer 20 may include a dielectric. For example, the lower insulating layer 20 may include $Al_2O_3$. Alternatively, the lower insulating layer 20 may include a silicon oxide or silicon nitride, but an embodiment of the inventive concept is not limited thereto. The lower insulating layer 20 may have a thickness of about 5 nm to about 15 nm.

The lower metal oxide layer 30 may be provided on the lower insulating layer 20. The lower metal oxide layer 30 may include a transparent layer. The lower metal oxide layer 30 may include ITO. According to an example, the lower metal oxide layer 30 may include a first lower metal oxide layer 32 and a second lower metal oxide layer 34. The first lower metal oxide layer 32 may have a thickness of about 4 nm to about 10 nm. The second lower metal oxide layer 34 may be provided on the first lower metal oxide layer 32. The second lower metal oxide layer 34 may have oxide concentration different from that of the first lower metal oxide layer 32. The second lower metal oxide layer 34 may have a thickness of about 4 nm to about 10 nm.

The metal layer 40 may be provided on the second lower metal oxide layer 34. The metal layer 40 may be a transflective layer. The metal layer 40 may include silver (Ag).

The upper metal oxide layer 50 may be provided on the metal layer 40. The upper metal oxide layer 50 may include a transparent layer. The upper metal oxide layer 50 may include ITO. According to an example, the upper metal oxide layer 50 may include a first upper metal oxide layer 52 and a second upper metal oxide layer 54. The first upper metal oxide layer 52 may have a thickness of about 4 nm to about 10 nm. The second upper metal oxide layer 54 may be provided on the first upper metal oxide layer 52. The second upper metal oxide layer 54 may have oxide concentration different from that of the first upper metal oxide layer 52. The second upper metal oxide layer 54 may have a thickness of about 4 nm to about 10 nm.

The upper insulating layer 60 may be provided on the second upper metal oxide layer 54. The upper insulating layer 60 may be the same as the lower insulating layer 20. The upper insulating layer 60 may include a dielectric. For example, the upper insulating layer 60 may include $Al_2O_3$. Alternatively, the upper insulating layer 60 may include a silicon oxide or silicon nitride, but an embodiment of the inventive concept is not limited thereto.

The antenna electrodes 70 may be provided on the upper insulating layer 60. The antenna electrodes 70 may have a smaller area size than the lower electrode 10. The antenna electrodes 70 may include aluminum (Al). The antenna electrodes 70 may have a thickness of about 60 nm. The antenna electrodes 70 may be spaced at a pitch of about 122 nm to about 340 nm. A bias voltage may be provided between the antenna electrodes 70 and the lower electrode 10. The bias voltage may be about 10 V.

When the bias voltage is provided between the antenna electrodes 70 and the lower electrode 10, and light is provided to the metal oxide layer 50, the metal layer 40, and the lower metal oxide layer 30, complex light modulation of electromagnetic and magnetic fields may be generated.

Therefore, the meta-structure 100 of the inventive concept may increase complex light modulation efficiency using the upper metal oxide layer 50, the metal layer 40, and the lower metal oxide layer 30 between the lower insulating layer 20 and the upper insulating layer 60.

Meanwhile, the antenna electrodes 70 may have a characteristic of adjusting a resonance wavelength of light. The lower electrode 10 may function as a light reflective plate.

Figure 2:
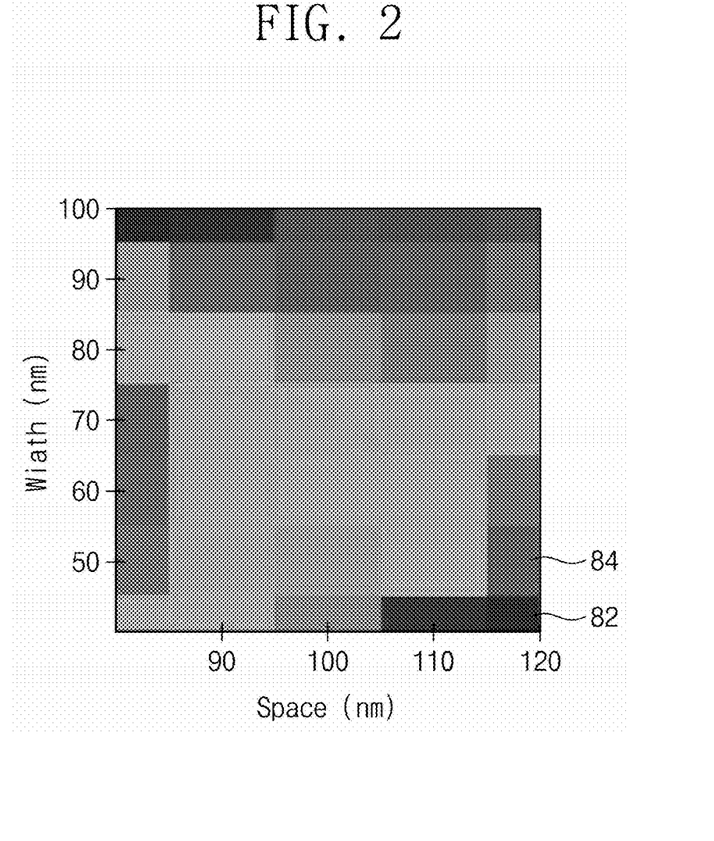
FIG. 2 is a diagram illustrating a complex area of reflectance that changes according to a width and separation distance of the antenna electrodes of FIG. 1.
Figure 3A:
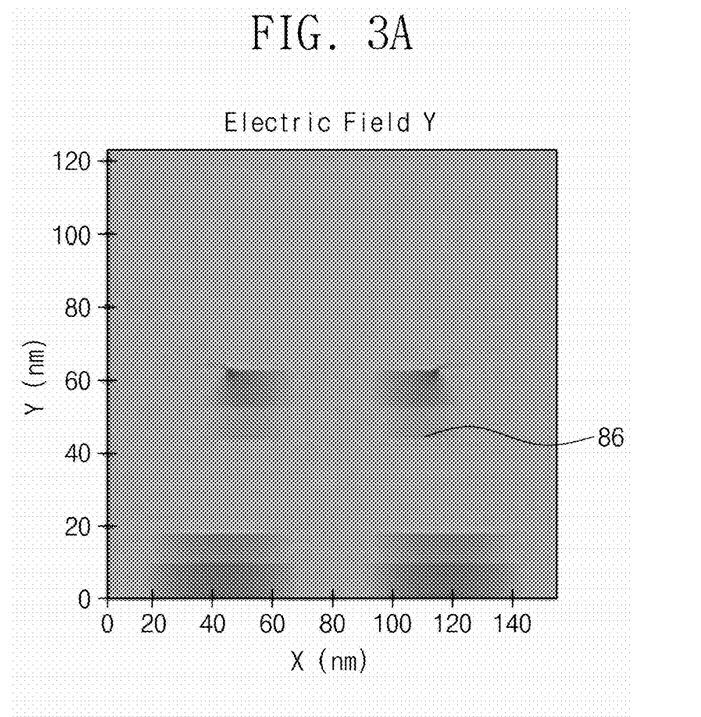
FIG. 3A, FIG. 3B, FIG. 3C and FIG. 3D are diagrams illustrating an electric field of direction X, an electric field of direction Y, a magnetic field, and a Poynting vector within a meta-structure when the antenna electrodes 70 of FIG. 1 have a width of about 70 nm and a separation distance of about 100 nm.
Figure 3B:
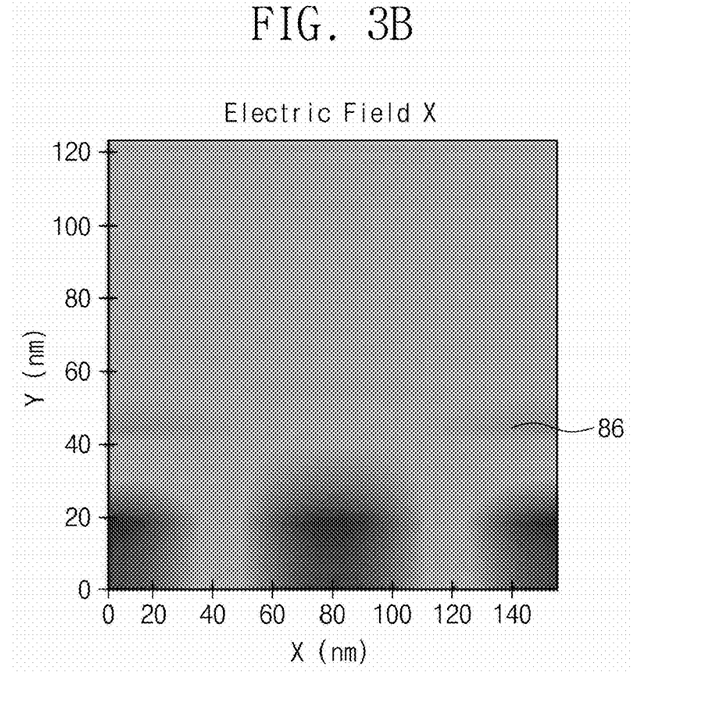
Figure 3C:
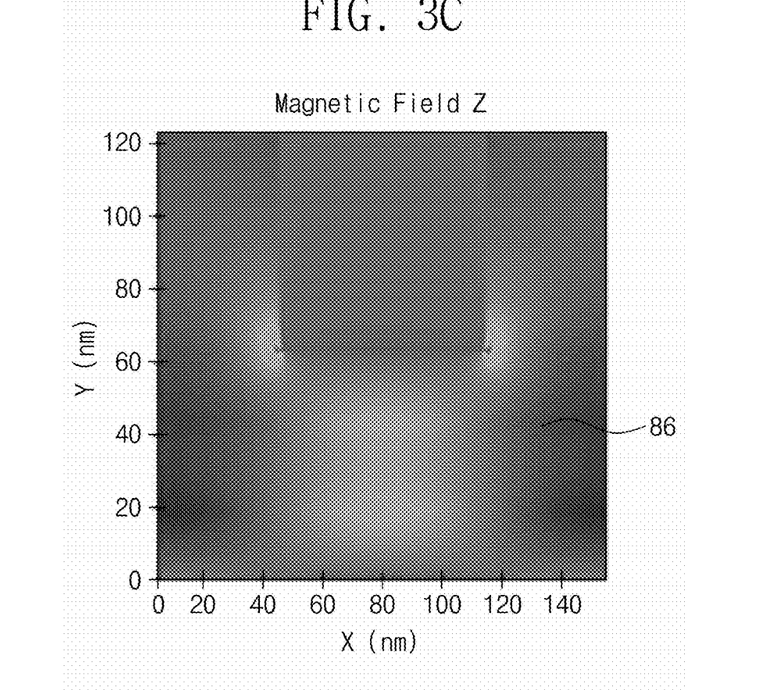
Figure 3D:
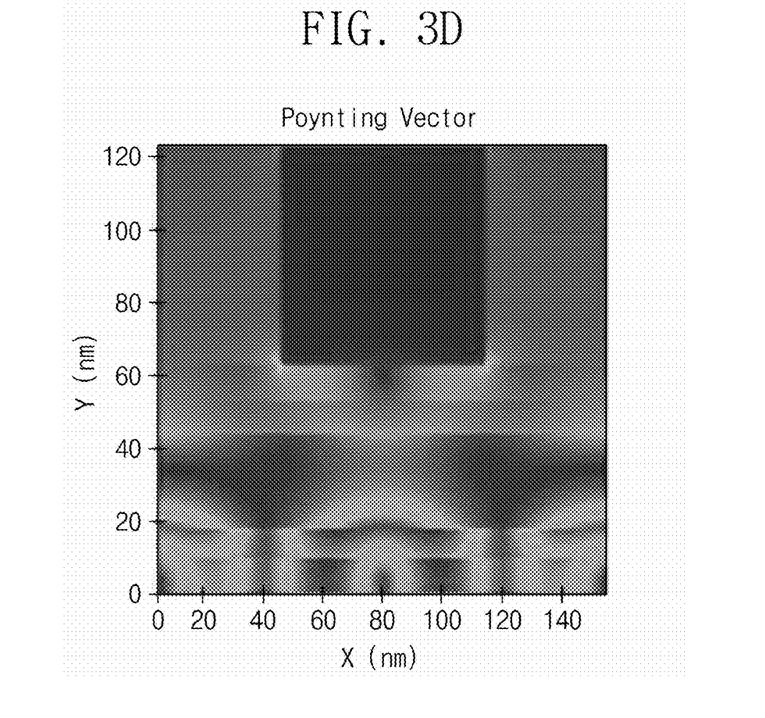

FIG. 2 shows a complex area of reflectance that changes according to a width and separation distance of the antenna electrodes 70 of FIG. 1.

Referring to FIG. 2, a first peak 82 and second peaks 84 of a complex area may be generated according to a width w and separation distance of the antenna electrodes 70. The first peak 82 may be higher than the second peaks 84.

The first peak 82 of the complex area may appear when the width w of the antenna electrodes 70 is about 40 nm and the separation distance is about 120 nm. The antenna electrodes 70 may have a pitch p of about 160 nm.

The second peaks 84 of the complex area may appear when the width w of the antenna electrodes 70 is about 70 nm and the separation distance is about 80 nm. The antenna electrodes 70 may have a pitch p of about 150 nm. Furthermore, the second peaks 84 of the complex area appears when the width w of the antenna electrodes 70 is about 50 nm and the separation distance is about 120 nm. The antenna electrodes 70 may have a pitch p of about 170 nm. Therefore, the antenna electrodes 70 may have a pitch p of about 150 nm to about 170 nm.

FIGS. 3A to 3D illustrate an electric field of direction X, an electric field of direction Y, a magnetic field, and a Poynting vector within the meta-structure 100 when the antenna electrodes 70 of FIG. 1 have the width w of about 70 nm and the separation distance of about 100 nm.

Referring to FIGS. 3A to 3D, characteristics of the electric field and magnetic field may have two nodes 86. A characteristic of the Poynting vector may have surface plasma polariton (SPP). The SPP may be strongly exhibited between the lower and upper metal oxide layers 30 and 50 and the metal layer 40. Furthermore, gap SPP may be generated between the lower and upper metal oxide layers 30 and 50 and the lower and upper insulating layers 20 and 60.

Therefore, the meta-structure 100 of the inventive concept may have a strong SPP mode generated between the lower and upper metal oxide layers 30 and 50 and the metal layer 40 and a gap SPP mode between the lower electrode 10 and the antenna electrodes 70. The meta-structure 100 may have complex modulation efficiency that changes according to the gap SPP mode. According to an example, the complex modulation efficiency may be determined by the width w, pitch p, and separation distance of the antenna electrodes 70 and the thicknesses of the metal layer 40 and the upper metal oxide layer 50.

Figure 4A:
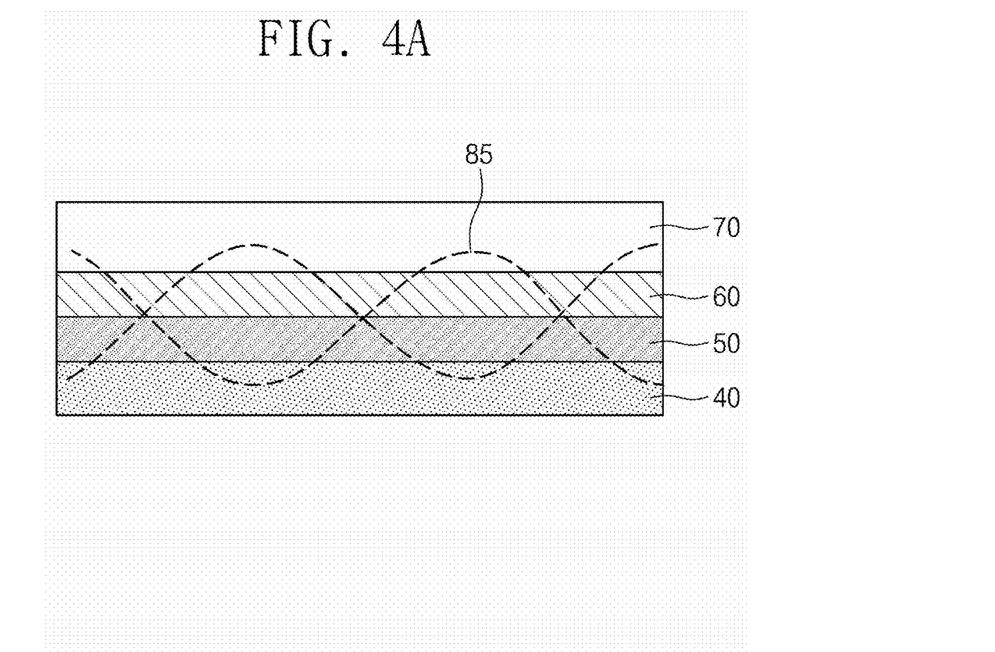
FIGS. 4A and 4B are cross-sectional views illustrating an example of the antenna electrodes, the upper insulating layer, the upper metal oxide layer, and the metal layer of FIG. 1.
Figure 4B:
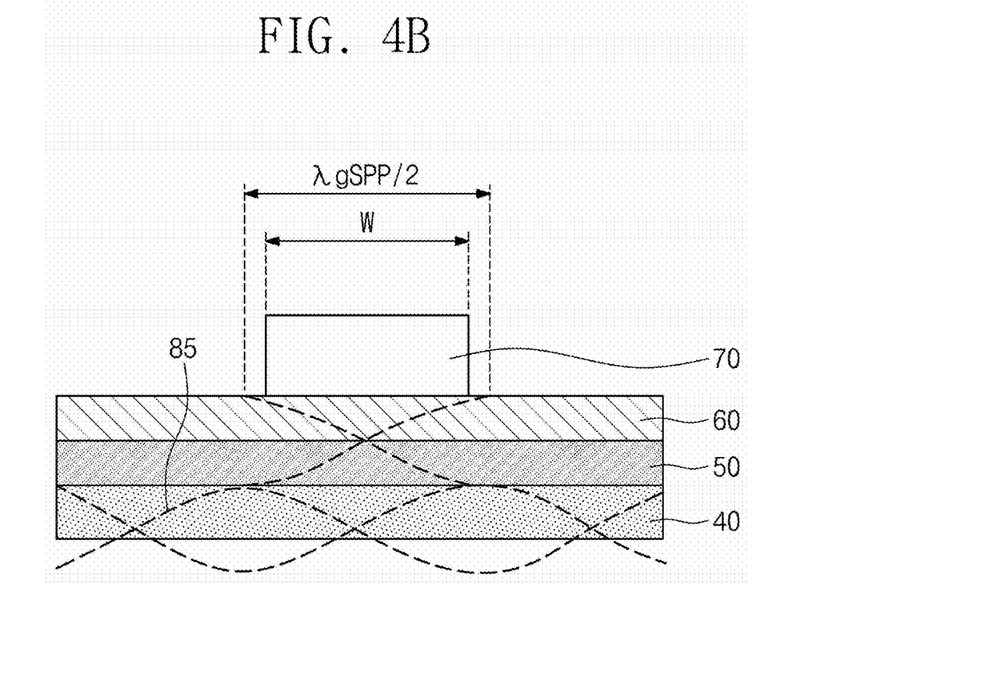

FIGS. 4A and 4B illustrate an example of the antenna electrodes 70, the upper insulating layer 60, the upper metal oxide layer 50, and the metal layer 40 of FIG. 1.

Referring to FIGS. 4A and 4B, a gap SPP may be generated by providing visible light 85 in the antenna electrodes 70, the upper insulating layer 60, the upper metal oxide layer 50, and the metal layer 40. The gap SPP may include an ideal gap SPP and actual gap SPP.

The ideal gap SPP may appear when the width w of the antenna electrodes 70 is the same as the width of the upper insulating layer 60. A resonance wavelength of the ideal gap SPP may be expressed as Equation 1.

$$\lambda_{gSPP\_ideal} = \frac{2\pi w}{\pi \cdot \varphi}. \qquad [\text{Equation 1}]$$

Where $\lambda_{gSPP\_ideal}$ may denote the resonance wavelength of gap SPP, w may denote the width w of the antenna electrodes 70, and Φ may denote a phase of light. An ideal gap SPP may be proportional to the width w of the antenna electrodes 70 and inversely proportional to the phase Φ.

The actual gap SPP may appear when the antenna electrodes 70 have a smaller width w than that of the upper insulating layer 60. The actual gap SPP may have a lower resonance wavelength than that of the ideal gap SPP.

$$\lambda_{gSPP\_real} = \frac{2\pi w}{\pi \cdot \varphi} \frac{1}{1.14} = k2w \qquad [\text{Equation 2}]$$

Where $\lambda_{gSPP\_real}$ may denote the resonance wavelength of actual gap SPP, w may denote the width of the antenna electrodes 70, Φ may denote a phase of light, and k may be a constant obtained through FDTD simulation. k may be about 1.25. The width w of the antenna electrodes 70 may be obtained by dividing the resonance wavelength of a gap SPP by 2 k.

Figure 5A:
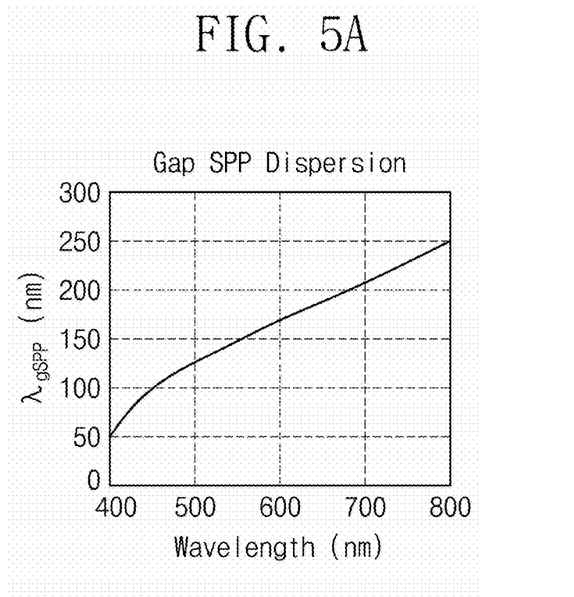
FIGS. 5A and 5B are graphs illustrating an example of a dispersion and mode index of the gap SPP of FIGS. 4A and 4B.
Figure 5B:
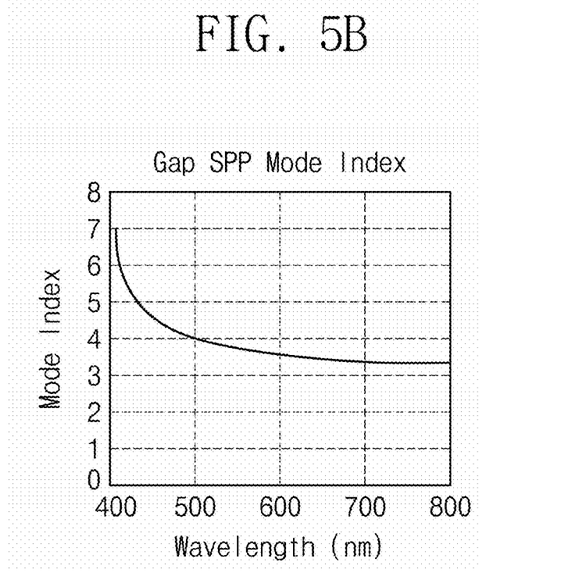

FIGS. 5A and 5B illustrate an example of a dispersion and mode index of the gap SPP of FIGS. 4A and 4B.

Referring to FIGS. 5A and 5B, the mode index of the gap SPP is about 3.6 at a wavelength of about 626 nm, and the resonance wavelength of the gap SPP dispersion is about 626 nm/3.6=174 nm. The width w of the antenna electrodes 70 may be about 70 nm, and the resonance wavelength of gap SPP may be calculated as 70 nm×1.25×2=175 nm.

Next, a hybrid SPP mode in which resonance may occur within the pitch p determined by a gap SPP may be activated in the structure. Here, two hybrid SPP modes may be generated. When two hybrid SPP modes are activated, complex modulation efficiency may increase.

Figure 6:
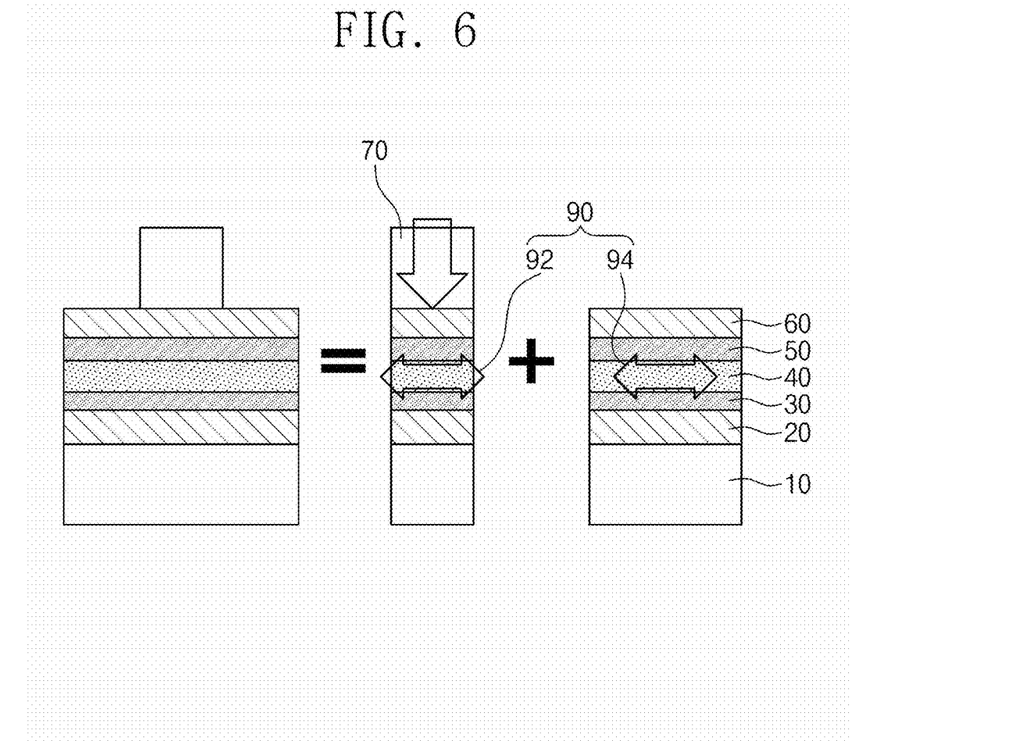
FIG. 6 is a cross-sectional view illustrating an example of the lower electrode, the lower insulating layer, the lower metal oxide layer, the metal layer, the upper metal oxide layer, the upper insulating layer, and the antenna electrodes of FIG. 1.

FIG. 6 illustrates an example of the lower electrode 10, the lower insulating layer 20, the lower metal oxide layer 30, the metal layer 40, the upper metal oxide layer 50, the upper insulating layer 60, and the antenna electrodes 70 of FIG. 1.

Referring to FIG. 6, the lower electrode 10, the lower insulating layer 20, the lower metal oxide layer 30, the metal layer 40, the upper metal oxide layer 50, the upper insulating layer 60, and the antenna electrodes 70 may generate a hybrid SPP mode 90. The hybrid SPP mode 90 may be calculated as a sum of an hSPP_Al mode 92 and hSPP_air mode 94. The hSPP_Al mode 92 may appear in a region in which the antenna electrodes 70 are present, and the hSPP_air mode 94 may appear in a region in which the antenna electrodes 70 are absent.

In a mode having a similar mode index, among the hSPP_Al mode 92 and the hSPP_air mode 94, light is transmitted through an interface without being reflected, thus satisfying a condition of inducing resonance within the pitch p determined by the gap SPP. In a mode having a different mode index, among the hSPP_Al mode 92 and the hSPP_air mode 94, light is reflected from an interface, and thus resonance does not occur.

Figure 7:
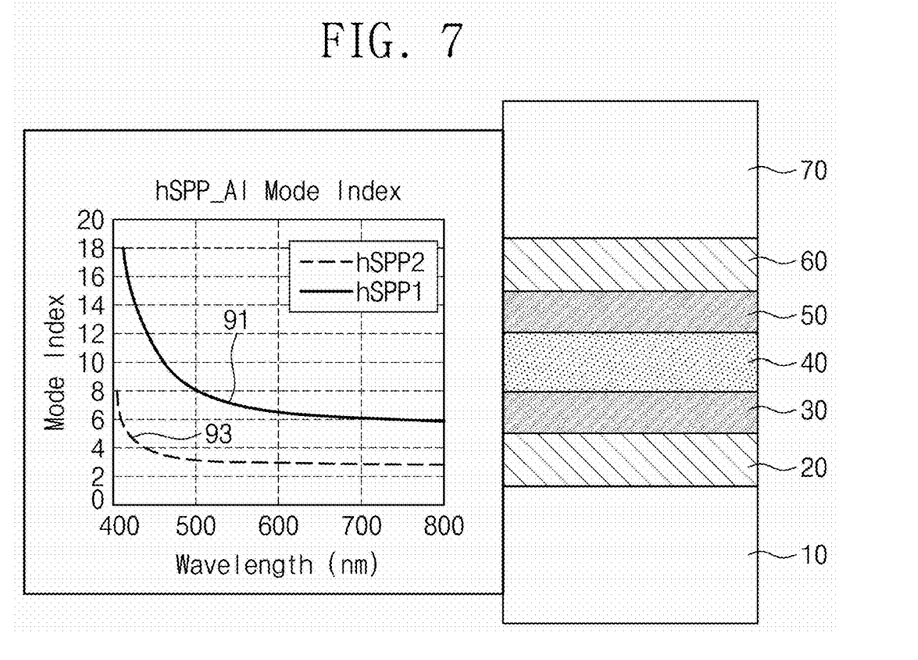
FIG. 7 is a graph illustrating an example of a mode index of hSPP_Al mode exhibited due the lower electrode to the antenna electrodes of FIG. 1.

FIG. 7 illustrates an example of a mode index of the hSPP_Al mode 92 exhibited due to the lower electrode 10 to the antenna electrodes 70 of FIG. 1.

Referring to FIG. 7, the hSPP_Al mode 92 may have an hSPP_Al_1 mode 91 and hSPP_Al_2 mode 93. The hSPP_Al_1 mode 91 and hSPP_Al_2 mode 93 may be short range modes of the hSPP_Al mode 92. The hSPP_Al_1 mode 91 may have a mode index of about 6 with respect to light of a wavelength of about 626 nm. The hSPP_Al_2 mode 93 may have a mode index of about 2.2 with respect to light of a wavelength of about 626 nm.

Figure 8:
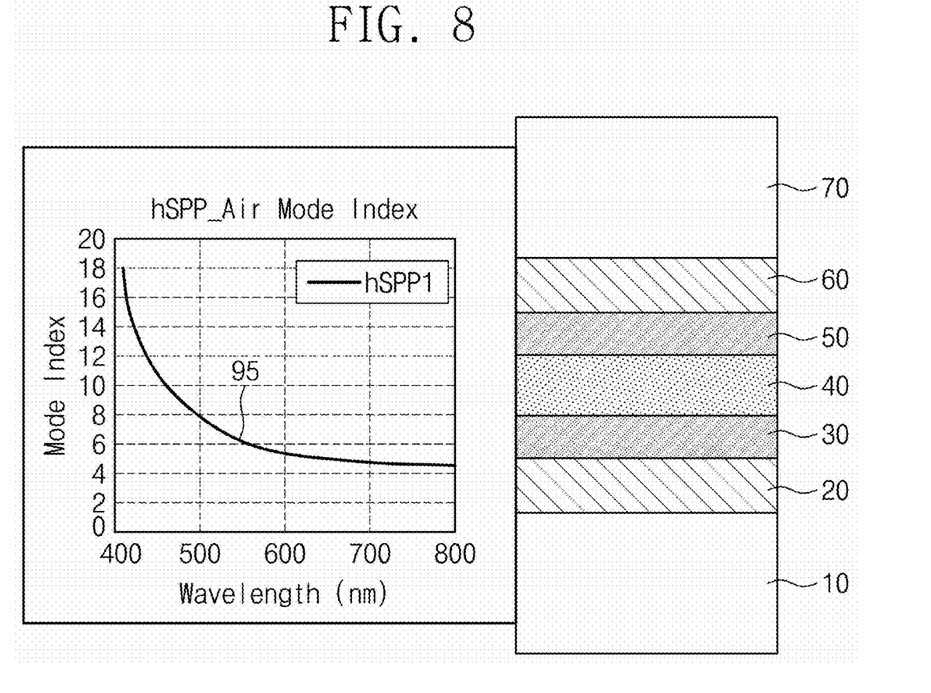
FIG. 8 is a graph illustrating an example a mode index of hybrid SPP_air mode among the lower electrode to the upper insulating layer of FIG. 1.

FIG. 8 illustrates an example of a mode index of the hSPP_air mode 94 among the lower electrode 10 to the upper insulating layer 60 of FIG. 1.

Referring to FIG. 8, the hSPP_air mode 94 may have an hSPP_air_1 mode 95. The hSPP_air_1 mode 95 may be a single short range mode of the hSPP_air mode 94. The hSPP_air_1 mode 95 may have a mode index of about 5.5 with respect to light of a wavelength of about 626 nm.

The hSPP_Al_1 mode 91 and the hSPP_air_1 mode 95 have a similar mode index and thus contribute to system resonance, but the hSPP_Al_2 mode 93 depends on the antenna electrodes 70 and are thus unable to contribute to system resonance. A modulation characteristic of the visible light 85 may be determined according to the pitch p, width w, and separation distance of the antenna electrodes 70 as expressed by Equation 3.

$$\frac{\lambda_{hSPP}(\lambda)}{2} = \frac{\lambda_{gSPP}(\lambda)}{2r}, \qquad [\text{Equation 3}]$$

$$p = \text{Pitch}(\lambda) = m\left(\frac{\lambda_{hSPP}(\lambda)}{2}\right) = m\left(\frac{\lambda_{gSPP}(\lambda)}{2r}\right)$$

$$w = \text{Width}(\lambda) = \frac{\lambda_{hSPP}(\lambda)}{2}\left(\frac{1}{k} + (r-1)\right) = \frac{\lambda_{gSPP}(\lambda)}{2}\left(\frac{1}{rk} + 1 - \frac{1}{r}\right)$$

-continued $$s = \text{Space}(\lambda) = \frac{\lambda_{gSPP}(\lambda)}{2}\left(\frac{m}{r} - \frac{1}{rk} - 1 + \frac{1}{r}\right)$$

$$\frac{m}{2} = \left(\frac{w}{\lambda_{hSPP\_Al}(\lambda)} + \frac{p-w}{\lambda_{hSPP\_air}(\lambda)}\right)$$

Where $\lambda_{hSPP}(\lambda)$ denotes a wavelength of the hybrid SPP mode 90, $\lambda_{gSPP}(\lambda)$ denotes a wavelength of the gap SPP mode, m is a natural number and represents mth high-order term of an overall system, and r denotes a high-order term of the gap SPP mode. The pitch p, width w, and separation distance of the antenna electrodes 70 may determine a size of complex modulation area according to the values of m and r.

First, a basic first mode in which m=2 and r=1 renders the complex modulation area large, and may be calculated as expressed by Equation 4.

$$p = \text{Pitch}(\lambda) = 2\left(\frac{\lambda_{gSPP}(\lambda)}{2}\right) = 2\left(\frac{\lambda_{hSPP}(\lambda)}{2}\right) \quad \text{[Equation 4]}$$

$$w = \text{Width}(\lambda) = \frac{\lambda_{hSPP}(\lambda)}{2}\left(\frac{1}{k}\right) = \frac{\lambda_{gSPP}(\lambda)}{2}\left(\frac{1}{k}\right)$$

$$s = \text{Space}(\lambda) = \frac{\lambda_{gSPP}(\lambda)}{2}\left(2 - \frac{1}{k}\right)$$

$$1 = \left(\frac{w}{\lambda_{hSPP\_Al}(\lambda)} + \frac{p-w}{\lambda_{hSPP\_air}(\lambda)}\right)$$

Figure 9A:
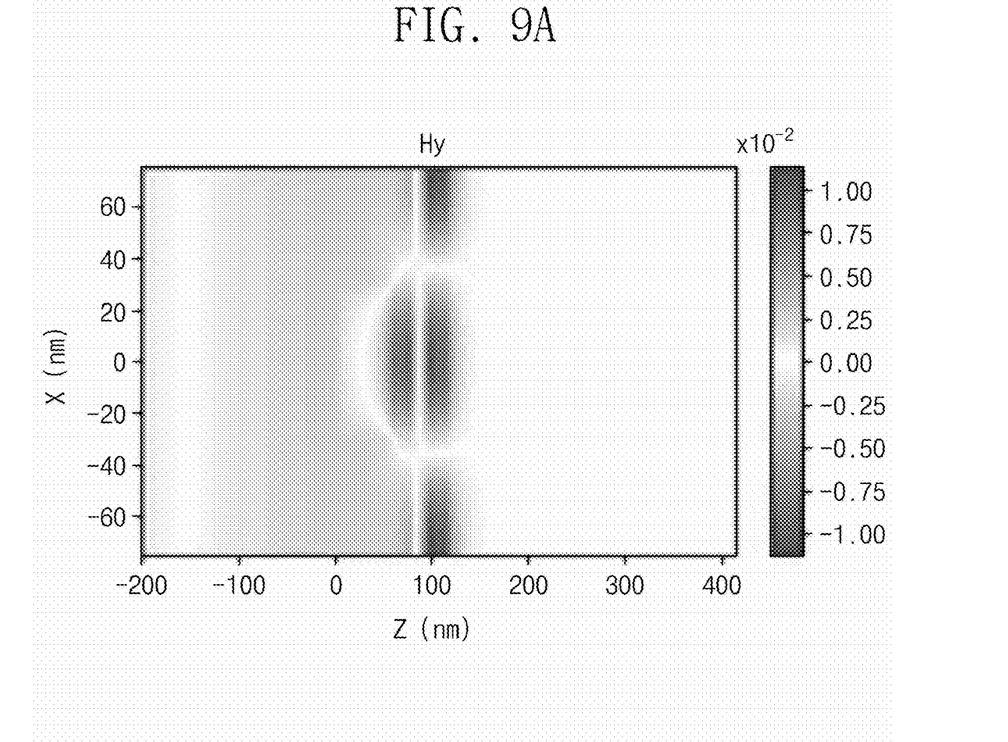
FIGS. 9A and 9B are diagrams illustrating a magnetic field and electric field of a first mode when the antenna electrodes of FIG. 1 have a width of about 60 nm and a separation distance of about 90 nm.
Figure 9B:
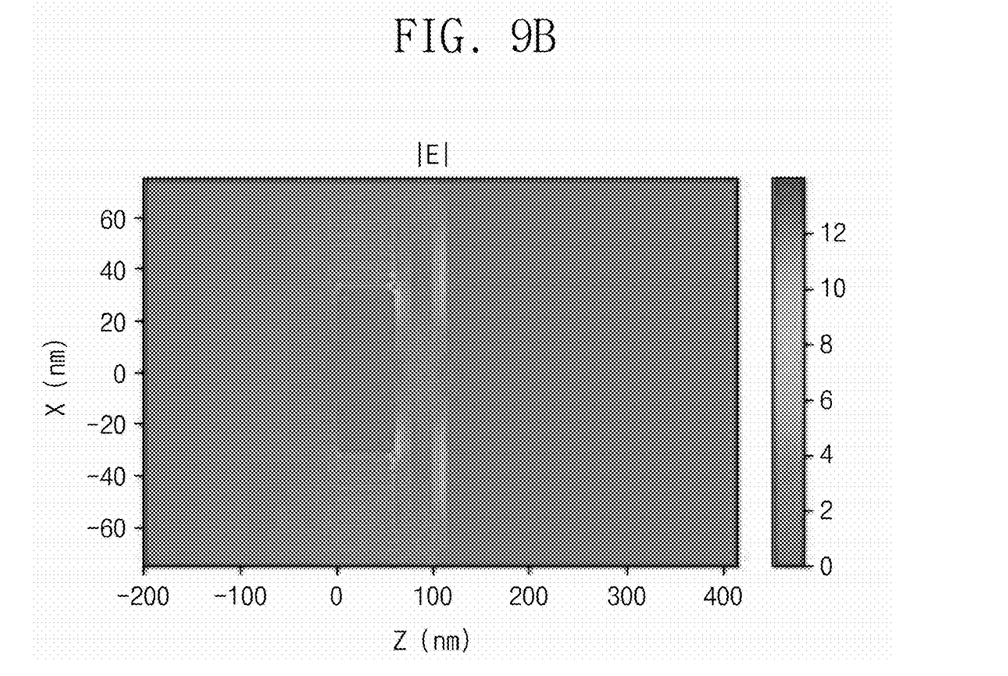

FIGS. 9A and 9B illustrate a magnetic field and electric field of a first mode when the antenna electrodes 70 of FIG. 1 have the width of about 60 nm and the separation distance of about 90 nm.

Referring to FIGS. 9A and 9B, when m is 2, r is 1, and k=1.25, the resonance wavelength of the gap SPP may be about 150 nm. When the mode index of the first mode is calculated when the width w of the antenna electrodes 70 is about 60 nm and the separation distance is about 90 nm, the meta-structure 100 of the inventive concept may absorb and modulate the visible light 85 of a wavelength of about 660 nm.

Next, a second mode in which m=4 and r=1 renders the complex modulation area appropriate, and may be calculated as expressed by Equation 5.

$$p = \text{Pitch}(\lambda) = 4\left(\frac{\lambda_{gSPP}(\lambda)}{2}\right) = 4\left(\frac{\lambda_{hSPP}(\lambda)}{2}\right) \quad \text{[Equation 5]}$$

$$w = \text{Width}(\lambda) = \frac{\lambda_{hSPP}(\lambda)}{2}\left(\frac{1}{k} + (r-1)\right) = \frac{\lambda_{gSPP}(\lambda)}{2}\left(\frac{1}{k}\right)$$

$$s = \text{Space}(\lambda) = \frac{\lambda_{gSPP}(\lambda)}{2}\left(4 - \frac{1}{k}\right)$$

$$2 = \left(\frac{w}{\lambda_{hSPP\_Al}(\lambda)} + \frac{p-w}{\lambda_{hSPP\_air}(\lambda)}\right)$$

Figure 10A:
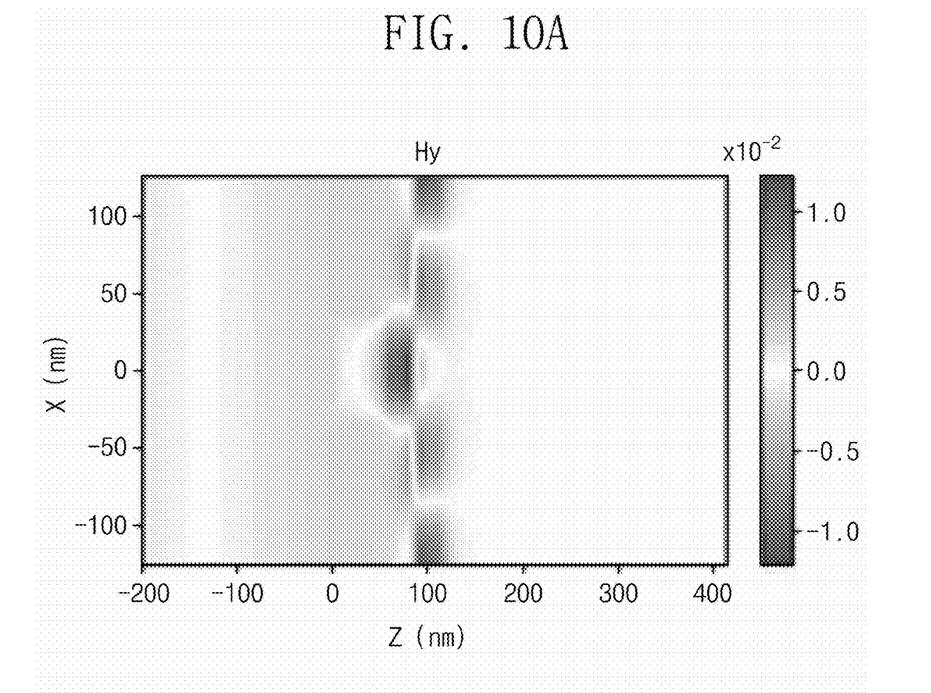
FIGS. 10A and 10B are diagrams illustrating a magnetic field and electric field of a second mode when the antenna electrodes of FIG. 1 have a width of about 70 nm and a separation distance of about 170 nm.
Figure 10B:
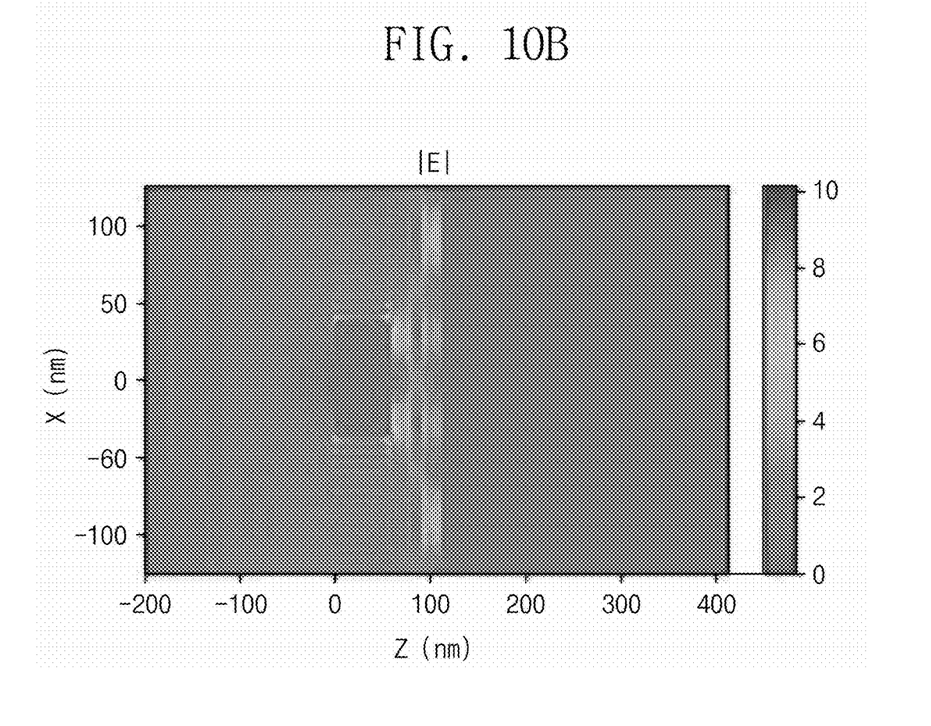

FIGS. 10A and 10B illustrate a magnetic field and electric field of a second mode when the antenna electrodes 70 of FIG. 1 have the width of about 70 nm and the separation distance of about 170 nm.

Referring to FIGS. 10A and 10B, when m is 4, r is 1, and k=1.25, the resonance wavelength of the gap SPP may be about 170 nm. When the mode index of the second mode is calculated when the width w of the antenna electrodes 70 is about 70 nm and the separation distance is about 170 nm, the meta-structure 100 of the inventive concept may absorb and modulate the visible light 85 of a wavelength of about 660 nm.

Next, a third mode in which m=4 and r=2 renders the complex modulation area maximum, and may be calculated as expressed by Equation 6.

$$p = \text{Pitch}(\lambda) = 4\left(\frac{\lambda_{hSPP}(\lambda)}{2}\right) = 2\left(\frac{\lambda_{gSPP}(\lambda)}{3}\right) \quad \text{[Equation 6]}$$

$$w = \text{Width}(\lambda) = \frac{\lambda_{hSPP}(\lambda)}{2}\left(\frac{1}{k} + 2\right) = \frac{\lambda_{gSPP}(\lambda)}{2}\left(\frac{1}{3k} + \frac{2}{3}\right)$$

$$s = \text{Space}(\lambda) = \frac{\lambda_{hSPP}(\lambda)}{2}\left(2 - \frac{1}{k}\right)$$

$$2 = \left(\frac{w}{\lambda_{hSPP\_Al}(\lambda)} + \frac{p-w}{\lambda_{hSPP\_air}(\lambda)}\right)$$

Figure 11A:
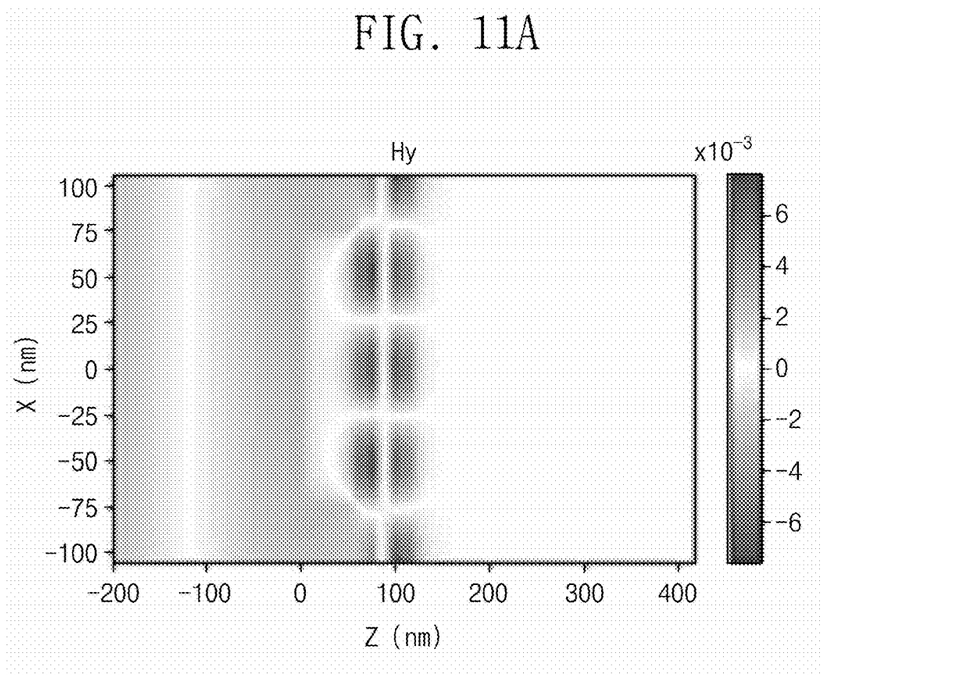
FIGS. 11A and 11B are diagrams illustrating a magnetic field and electric field of a third mode when the antenna electrodes of FIG. 1 have a width of about 150 nm and a separation distance of about 210 nm.
Figure 11B:
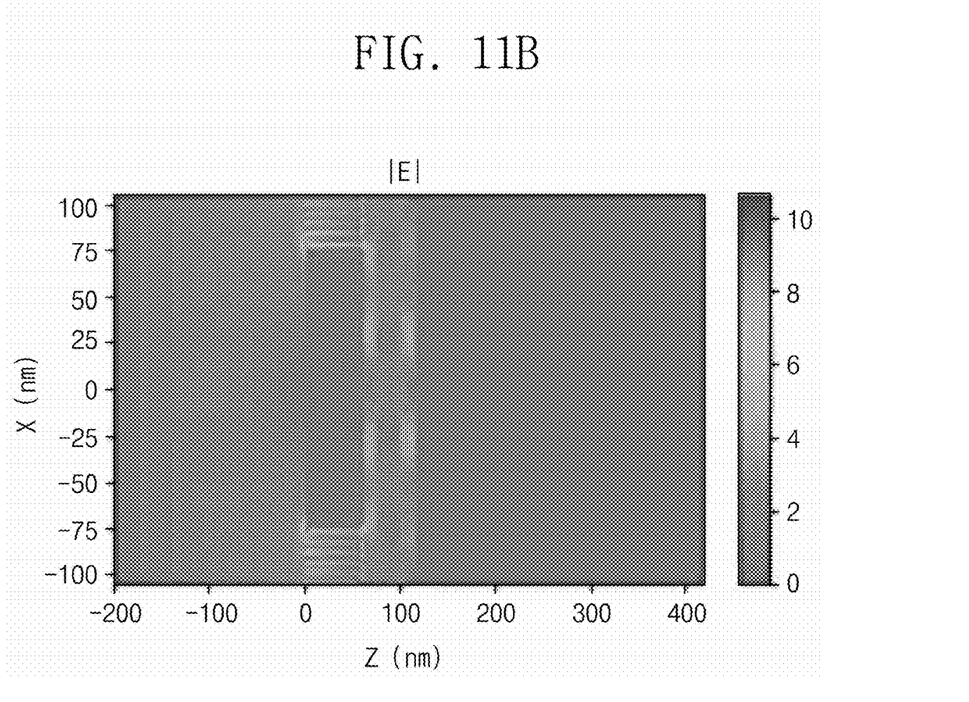

FIGS. 11A and 11B illustrate a magnetic field and electric field of a third mode when the antenna electrodes 70 of FIG. 1 have the width of about 150 nm and the separation distance of about 210 nm.

Referring to FIGS. 11A and 11B, when m is 4, r is 2, and k=1.25, the resonance wavelength of the hybrid SPP may be about 107 nm. When the mode index of the third mode is calculated when the width w of the antenna electrodes 70 is about 150 nm and the separation distance is about 210 nm, the meta-structure 100 of the inventive concept may absorb and modulate the visible light 85 of a wavelength of about 532 nm.

As described above, a meta-structure according to an embodiment of the inventive concept may increase complex light modulation efficiency using a lower metal oxide layer, a metal layer, and an upper metal oxide layer between lower and upper insulating layers.

Although the embodiments of the present invention have been described, it is understood that the present invention should not be limited to these embodiments but various changes and modifications can be made by one ordinary skilled in the art within the spirit and scope of the present invention as hereinafter claimed.

STATEMENT REGARDING PRIOR DISCLOSURES BY THE INVENTOR OR A JOINT INVENTOR

The inventors of the present application have made related disclosure in YONG-HAE KIM et al., "Active metasurface using ITO device in visible wavelength", META 2022 Torremolinos-Spain, The 12th International Conference on Metamaterials, Photonic Crystals and Plasmonics, July 2022. The related disclosure was made less than one year before the effective filing date (Oct. 5, 2022) of the present application and the inventors of the present application are the same as those of the related disclosure. Accordingly, the related disclosure is disqualified as prior art under 35 USC 102(a)(1) against the present application. See USC 102(b)(1)(A).

What is claimed is:
1. A meta-structure comprising:
a lower electrode;
a lower insulating layer on the lower electrode;
a lower metal oxide layer on the lower insulating layer;
a metal layer on the lower metal oxide layer;

an upper metal oxide layer on the metal layer;
an upper insulating layer on the upper metal oxide layer; and
antenna electrodes on the upper insulating layer.

2. The meta-structure of claim 1, wherein the lower metal oxide layer includes:
a first lower metal oxide layer; and
a second lower metal oxide layer on the first lower metal oxide layer.

3. The meta-structure of claim 1, wherein the upper metal oxide layer further includes:
a first upper metal oxide layer; and
a second upper metal oxide layer provided between the first upper metal oxide layer and the upper insulating layer and aligned with the antenna electrodes.

4. The meta-structure of claim 1, wherein the lower metal oxide layer and the upper metal oxide layer each include indium tin oxide (ITO).

5. The meta-structure of claim 1, wherein the metal layer includes silver.

6. The meta-structure of claim 1, wherein the lower insulating layer and the upper insulating layer include an aluminum oxide.

7. The meta-structure of claim 1, wherein the antenna electrodes have a width of 40 nm and a separation distance of 120 nm.

8. The meta-structure of claim 1, wherein the antenna electrodes have a width of 50 nm and a separation distance of 120 nm.

9. The meta-structure of claim 1, wherein the antenna electrodes have a width of 70 nm and a separation distance of 80 nm.

10. The meta-structure of claim 1, wherein the antenna electrodes have a pitch of 150 nm to 170 nm.

11. The meta-structure of claim 1, wherein the antenna electrodes have a width of 60 nm and a separation distance of 90 nm.

12. The meta-structure of claim 1, wherein the antenna electrodes have a width of 70 nm and a separation distance of 170 nm.

13. The meta-structure of claim 1, wherein the antenna electrodes have a width of 150 nm and a separation distance of 210 nm.

* * * * *